United States Patent [19]

Carl et al.

[11] Patent Number: 4,890,961
[45] Date of Patent: Jan. 2, 1990

[54] LATHE TOOL EQUIPPED WITH REVERSIBLE PLATES FOR CUTTING GROOVES OR THREADS

[75] Inventors: Hans-Georg Carl, Asperg; Roland Beuchler, Höfendorf, both of Fed. Rep. of Germany

[73] Assignee: Montanwerke Walter GmbH, Tübingen, Fed. Rep. of Germany

[21] Appl. No.: 101,865

[22] Filed: Sep. 25, 1987

[30] Foreign Application Priority Data

Nov. 20, 1986 [DE] Fed. Rep. of Germany ....... 3639672

[51] Int. Cl.⁴ ............................................. B23B 27/08
[52] U.S. Cl. .................................... 407/105; 407/107
[58] Field of Search ................. 407/113, 11, 114, 115, 407/116, 117, 103, 104, 105, 107, 111, 106

[56] References Cited

U.S. PATENT DOCUMENTS

| | | | |
|---|---|---|---|
| 3,314,126 | 4/1967 | Stier | 407/105 |
| 3,316,617 | 5/1967 | Stein | 407/117 |
| 3,653,107 | 4/1972 | Hertel | 407/117 |
| 3,760,474 | 9/1973 | Stein | 407/117 |
| 3,908,225 | 9/1975 | Faber | 407/105 |
| 3,940,835 | 3/1976 | Friedline | 407/117 |
| 4,188,162 | 2/1980 | Zweekley | 407/113 |
| 4,579,488 | 4/1986 | Griffin . | |

FOREIGN PATENT DOCUMENTS

| | | |
|---|---|---|
| 0137680 | 4/1985 | European Pat. Off. . |
| 1602731 | 5/1970 | Fed. Rep. of Germany . |
| 2326748 | 1/1974 | Fed. Rep. of Germany . |
| 2315044 | 10/1974 | Fed. Rep. of Germany . |
| 2637757 | 5/1978 | Fed. Rep. of Germany . |
| 3204999 | 10/1985 | Fed. Rep. of Germany . |
| 2139951 | 1/1973 | France . |
| 2203688 | 5/1974 | France . |
| 2284401 | 4/1976 | France . |
| 2481168 | 10/1981 | France . |
| 2543859 | 10/1984 | France . |
| 2070472 | 9/1981 | United Kingdom . |

OTHER PUBLICATIONS

Patent Abstracts of Japan, JP-A-53 59 992, (Teijin Seiki K.K.) May 30, 1978.

Primary Examiner—Robert P. Olszewski
Assistant Examiner—Blynn Shideler
Attorney, Agent, or Firm—Spencer & Frank

[57] ABSTRACT

In a lathe tool composed of a holder and a reversible cutting plate for cutting a groove or thread, the holder being formed to have a recess for accommodating the cutting plate, the recess having a bottom face and a side face, and the cutting plate having a longitudinal dimension, two longitudinal spaced frontal end faces each having a cutting edge, a narrow longitudinally extending edge extending between the frontal end faces and arranged to bear against the bottom face of the recess, a longitudinally extending broad side extending between the frontal end faces and transversely to the narrow edge and arranged to bear against the side face of the recess, and a fastening bore having an axis extending transversely to the broad side, the lathe tool further including a clamping device for holding the cutting plate in the recess with the narrow edge and broad side of the cutting plate bearing against the bottom face and side face, respectively, of the recess, wherein the clamping device includes a clamping element disposed in the region of the side face of the recess and passing through the fastening bore in the recess, and the cutting plate is reversible in position relative to the holder about the axis of the fastening bore.

14 Claims, 4 Drawing Sheets

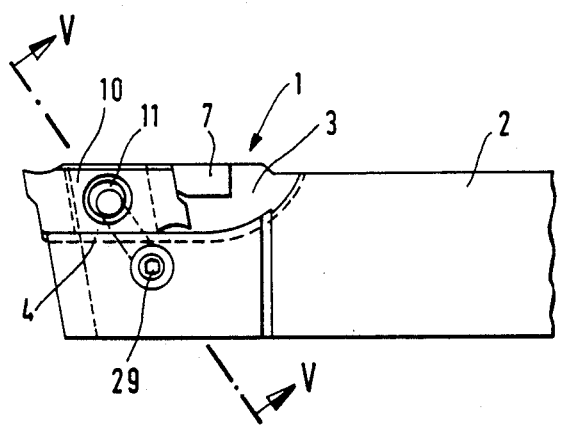
FIG.1
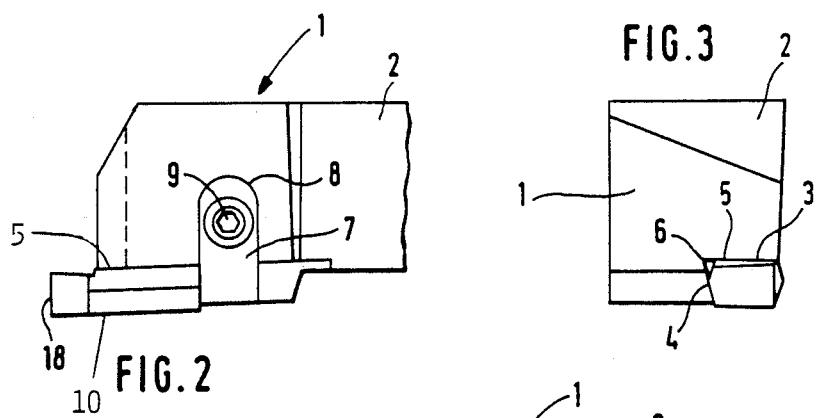

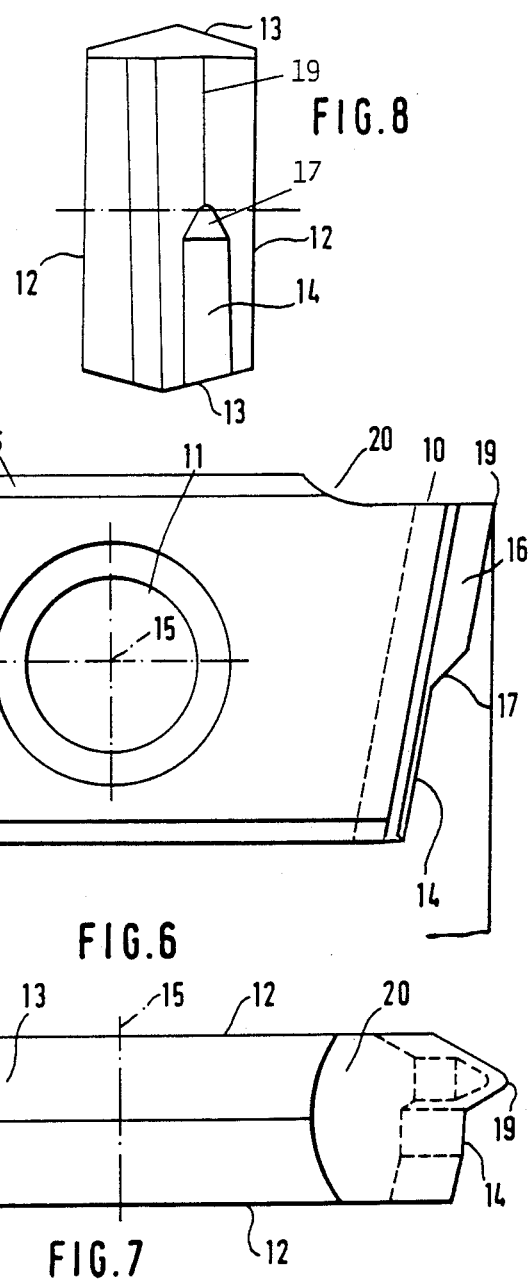

LATHE TOOL EQUIPPED WITH REVERSIBLE PLATES FOR CUTTING GROOVES OR THREADS

BACKGROUND OF THE INVENTION

The present invention relates to a lathe tool equipped with reversible plates for cutting grooves or threads and including a holder having a shaft. The shaft of such a lathe tool has a recess intended to accommodate the reversible plate, with the bottom face of the recess forming a support face and the sides forming contact faces for the reversible cutting plate which, when the plate is in the operating position, is disposed on edge. The lathe tool also has a clamping device with which the reversible cutting plate, when held against the lateral contact face, can be clamped against the bottom face and held in position against an associated axial abutment.

Various models of lathe tools of this type equipped with reversible plates are known in practice. They are always configured in such a manner that the unperforated, reversible cutting plate disposed on edge in the recess of the holder is pressed against its contact and support faces as well as against the axial abutment by means of a clamping or securing jaw. This clamping or securing jaw, however, interferes with the free removal of chips from the major cutting edge and, in some embodiments, is not easy and safe enough to operate.

In addition, there are other lathe tools equipped with reversible plates which are used to cut grooves or threads and in which the reversible cutting plate is not on edge when in the operating position but lies flat and is secured in a recess disposed on the upper side of the holder. The reversible cutting plate can here again be secured by means of a securing or clamping jaw which reaches over the reversible cutting plate. Embodiments are also known in which a reversible cutting plate is used which is a hole plate and which is secured at its fastening bore by means of a fastening screw which passes through the bore.

The planar arrangement of the disc-shaped reversible cutting plate requires a relatively complicated configuration for the reversible cutting plate which must have cut-on extensions or the like of a configuration conforming to the profile of the groove to be cut.

Most of the above-mentioned lathe tools additionally require different holders to accommodate the reversible cutting plates for cutting grooves and the reversible cutting plates for cutting threads, which is undesirable from the standpoint of manufacture and storage.

SUMMARY OF THE INVENTION

It is therefore an object of the invention to provide a lathe tool equipped with reversible cutting plates for cutting grooves or threads which employs reversible cutting plates of simple configuration, made from identical reversible cutting plate blanks only partially ground for the respective use which can be used with the same holder selectively for groove or thread cutting work and which simultaneously ensure proper, precisely accurate and reliable securing of the reversible cutting plate with simple means while taking care that chip removal is not interfered with.

The above and other objects are achieved, according to the invention, in a lathe tool composed of a holder and a reversible cutting plate for cutting a groove or thread, the holder being formed to have a recess for accommodating the cutting plate, the recess having a bottom face and a side face, and the cutting plate having a longitudinal dimension, two longitudinally spaced frontal end faces each having a cutting edge, a narrow longitudinally extending edge extending between the frontal end faces and arranged to bear against the bottom face of the recess, a longitudinally extending broad side extending between the frontal end faces and transversely to the narrow edge and arranged to bear against the side face of the recess, and a fastening bore having an axis extending transversely to the broad side, the lathe tool further including clamping means for holding the cutting plate in the recess with the narrow edge and broad side of the cutting plate bearing against the bottom face and side face, respectively, of the recess, by the improvement wherein:

the clamping means comprise a clamping element disposed in the region of the side face of the recess and passing through the fastening bore in the recess; and the cutting plate is reversible in position relative to the holder about the axis of the fastening bore.

Independently of its cutting edge section, the reversible cutting plate is properly secured at its support face and at its abutment face. Thus reversible cutting plates having the same basic shape can be selectively and exchangeably used in the same holder, with only the cutting edge section being configured to correspond to the respective purpose. The accuracy of the fastening is always independent of the cutting section.

The clamping member of the fastening device which is configured according to ISO standards and projects into the fastening bore, ensures chip discharge uninterfered with by securing or clamping jaws, etc., with the upper side of the holder also being configured to suit the intended purpose of guiding and discharging chips without consideration of the requirements for a clamping device. Finally, it is ensured without any special measures that the dimensions of the reversible cutting plate remain the same even if the cutting plate is reversed because it can be turned about its hole axis and not about a high transverse axis which extends at a right angle to the hole axis.

In a preferred embodiment, each abutment face is a planar face which, for precision sintered hard metal reversible cutting plates, generally does not require any working.

The bottom face of the recess in the holder may advantageously be inclined toward the side face so as to form an acute angle with that face, with the reversible cutting plate having correspondingly inclined narrow side faces. In this way, particularly for larger reversible cutting plates, the reversible cutting plate is additionally held in a form locking manner in the region of the support face of the recess and is simultaneously urged against the side face by the sloped face. For smaller reversible cutting plates these measures may possibly not be necessary so that the narrow side faces of the reversible cutting plates can be planar faces extending at a right angle to the broadsides.

The narrow side faces of the reversible cutting plate may also have a roof-shaped cross section, thus permitting selective use in the right or left holder.

Advisably, each abutment face of the reversible cutting plate is axially set back with respect to the adjacent cutting edge section, with the axial abutment being disposed in the region of the upper side of the holder so as to project beyond the side face in such a manner that it is essentially accommodated completely in the recess of the reversible cutting plate defined by the axially set back abutment face, thus resulting in particularly good chip removal.

In a simple embodiment, the clamping element of the clamping device may be a known clamping screw which passes through the fastening bore in the reversible cutting plate and is screwed into a corresponding threaded bore in the holder. In a preferred embodiment, however, the arrangement is such that the clamping device includes an angle lever which projects into the fastening bore of the reversible cutting plate with a pin-like arm which acts as a clamping element. This angle lever is pivotally mounted at the bottom of a recess disposed in the region of the side face, with a clamping screw screwed into a corresponding threaded bore in the holder being supported against the other arm of the angle lever. The angle lever is oriented with respect to the recess in the holder which accommodates the reversible cutting plate so that the reversible cutting plate, when the angle lever is tightened, is urged against the bottom and side faces of the recess and against their axial abutment and is thus fixed in the correct position.

Since the reversible cutting plate is secured only in the fastening bore and there are no interfering clamping jaws or similar members, a lubricant channel may be formed in the holder to act in the vicinity of the effective cutting edge section of the reversible cutting plate, the channel opening on the upper side of the holder. Particularly for lathe tools used to cut internal threads, this measure is significant since it makes it possible to facilitate the removal of chips which in this case is quite critical.

As already described, the novel lathe tool permits the use of identical reversible cutting plate blanks for cutting threads and for cutting grooves in the same holder. Only the cutting edge section of the reversible cutting plate must be ground to meet the required purpose.

BRIEF DESCRIPTION OF THE DRAWING

The drawing depict embodiments of the subject matter of the invention.

FIG. 1 is a side view of a lathe tool according to the invention equipped with a reversible cutting plate for cutting grooves.

FIG. 2 is a plan view of the lathe tool according to FIG. 1.

FIG. 3 is a front end view of the lathe tool according to FIG. 1.

FIG. 4 is a view similar to FIG. 2 of the lathe tool of FIG. 1 equipped with a reversible cutting plate suitable for cutting threads.

FIG. 6 is an enlarged side view of the reversible cutting plate shown in FIG. 4.

FIGS. 7 and 8 are a plan view and a frontal view, respectively, of the reversible cutting plate of FIG. 6.

DESCRIPTION OF THE PREFERRED EMBODIMENTS

Figure 12:
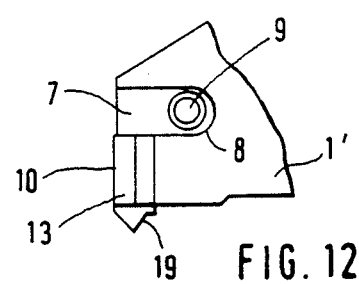
FIG. 12 is a detail plan view of the internal turning tool according to FIG. 9 equipped with a reversible cutting plate suitable for thread cutting work.

In the embodiments shown in FIGS. 1 to 5, the lathe tool configured as a tool holder is intended for work on external surfaces and in the embodiments according to FIGS. 6 to 12 for work on internal surfaces. It is intended in each case to provide the capability of cutting grooves (FIGS. 1, 2 and 9, 10) or threads (FIGS. 4, 12).

Each lathe tool includes a holder 1 or 1' secured to a shaft 2 or 2' serving as a receptacle. In the embodiment according to FIGS. 1 to 5, shaft 2 has a square cross section and in the embodiment according to FIGS. 6 to 12 it has a round cross section.

On the side of holder 1 there is provided a groove-like recess 3 which opens toward the upper and frontal faces of holder 1, the frontal face being at the left in FIGS. 1 and 2, and is located, in the embodiment according to FIGS. 1 to 5, and as shown in particular in FIGS. 2 to 4, along one side of holder 1, while in the embodiment according to FIGS. 9 to 12, it lies in the region of the frontal face of holder 1'.

In the region of interest, recess 3 is provided with an essentially planar bottom face 4 and a planar side face 5. Bottom face 4 is inclined with respect to the transverse direction toward side face 5, which lies in a vertical plane, so that bottom face 4 forms an acute angle 6 of the order of magnitude of, for example, 75°, with face 5. This can be seen most clearly in FIG. 3.

A flat, rail-like, axial abutment strip 7 projects at right angles from side wall 5 and extends into recess 3 to form an axial abutment. Abutment strip 7 is formed in a corresponding recess 8 in the upper face of holder 1 and is secured there by means of a fastening screw 9. In a manner shown, for example, in FIG. 1, abutment strip 7 is flush with the upper face of holder 1.

An on-edge reversible cutting plate 10, essentially having the form of a parallelogram and being equipped with a through going fastening bore 11 according to ISO standards is installed in recess 3.

FIGS. 6 to 8 show an embodiment of reversible cutting plate 10, which is precision sintered of hard metal, has two parallel broad sides 12 and is equipped with parallel narrow top and bottom edges 13 having a roof-like configuration when seen in cross section. Each one of the edges 13 intersects each adjacent broadside 12 at an obtuse angle which corresponds to the slope of bottom face 4 of recess 3 so that, when reversible cutting plate 10 is inserted into recess 3, one broadside 12 of reversible cutting plate 10 lies flush against the associated side wall 5 of recess 3.

Each frontal end face of reversible cutting plate 10 is provided with an abutment surface 14 extending essentially at a right angle with respect to the two broadsides 12 and inclined to edges 13. In dependence on the manufacturing accuracy of reversible cutting plate 10, abutment face 14 may be worked or unworked. The two abutment faces 14 are symmetrical with respect to the axis 15 of bore 11, as shown in FIG. 6. Starting at one narrow edge 13, a face 14 extends only over part of the respectively associated frontal end face height and is followed by a cutting-edge section 16 disposed at the frontal end face. Cutting edge section 16 is ground in a profile to correspond to the respective purpose, with the arrangement being such that each abutment face 14 is axially set back with respect to the adjacent cutting edge section 16, as shown most clearly in FIG. 6, such that they, together with an oblique transition face 17, define a recess open at the edge. In the embodiment shown in FIG. 6, abutment 14 and the front edge of the associated cutting edge 16 are essentially mutually parallel, but this is not obligatory. The edges of the two cutting edge sections 16 can be shaped as desired for the respective use.

Figure 9:
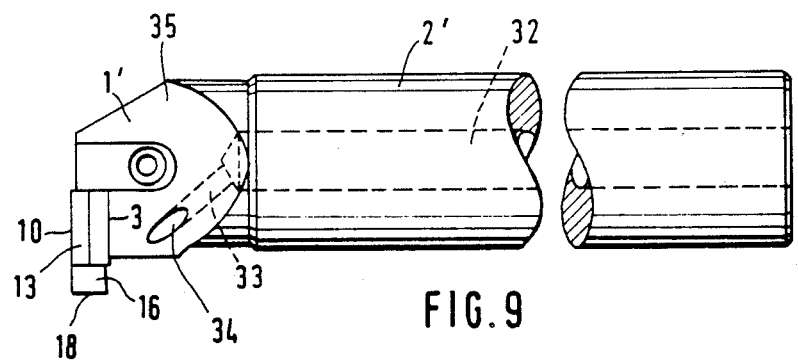
FIG. 9 is a plan view of an internal turning tool according to the invention equipped with a reversible cutting plate.
Figure 10:
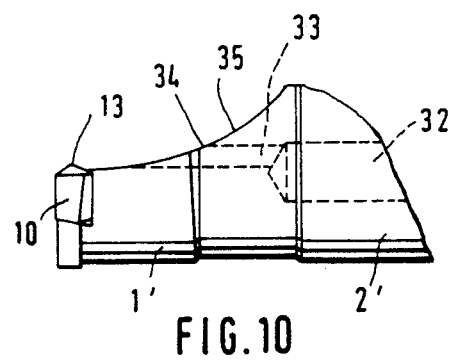
FIG. 10 is a detail side view of the internal turning tool according to FIG. 9.
Figure 11:
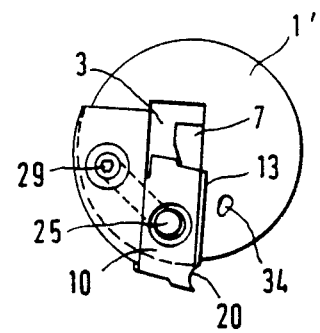
FIG. 11 is a frontal view of the internal turning tool of FIG. 9.

In the embodiment according to FIGS. 2 and 9, cutting edge section 16 has an essentially linear major cutting edge 18 perpendicular to broadsides 12, as it may be used to cut grooves having parallel flanks; in the embodiments according to FIGS. 4, 7 and 12, cutting edge section 16 has an acute angle profile at 19, as required for thread cutting work.

In the region of each narrow edge 13, reversible cutting plate 10 is provided with a cut-in chip guide groove 20 which extends to major cutting edge 18 and 19, respectively.

As can be seen, reversible cutting plate 10 can be reversed about its hole axis 15. To ensure accurate reversal of reversible cutting plate 10, the length dimension of the reversible cutting plate is selected such that a dimensioning point 21, shown in FIG. 6 and the point of contact of reversible cutting plate at abutment 7 of holder 1 are identical. In the embodiment according to FIGS. 1-5 no lubricant flow channel is provided in holder 1 and in shaft 2.

When reversible cutting plate 10 is inserted in recess 3, one abutment face 14 lies, as mentioned, against abutment strip 7 which is thus accommodated in the recess formed by set-back abutment face 14 so that, as shown in FIG. 1, an essentially planar, continuous, uninterrupted chip guide face results on the upper side of holder 1 which begins at the chip guide groove 20 associated with the active cutting edge. Only the two facing edges 13 of reversible cutting plate 10 need be worked, or machined, with precision so that the major cutting edges 18 or 19, respectively, will be placed in an exactly reproducible position when reversed. As already mentioned, the configuration of cutting edge sections 16 has no influence on the fix of the reversible cutting plate in recess 3 in the correct position. In the axial direction, such correct position is ensured only by the interaction of abutment 7 with the adjacent abutment face 1. Both broadsides 12 are configured as precisely dimensioned abutment faces for side face 5.

As can be seen, for example, in FIG. 6, reversible cutting plates 10, starting from the same blank configuration, may be ground at their cutting edge sections 16 to meet the respective purpose so that only a single holder 1 is required for all types of plate. The roof-like configuration of narrow edges 13, when seen in cross section, as in FIG. 8, permits selective use of the reversible cutting plates for left or right holders.

In simple cases, reversible cutting plate 10 may be fastened in recess 3 by means of a fastening screw which is screwed into a threaded bore provided in holder 1, flush with fastening bore 11.

Figure 5:
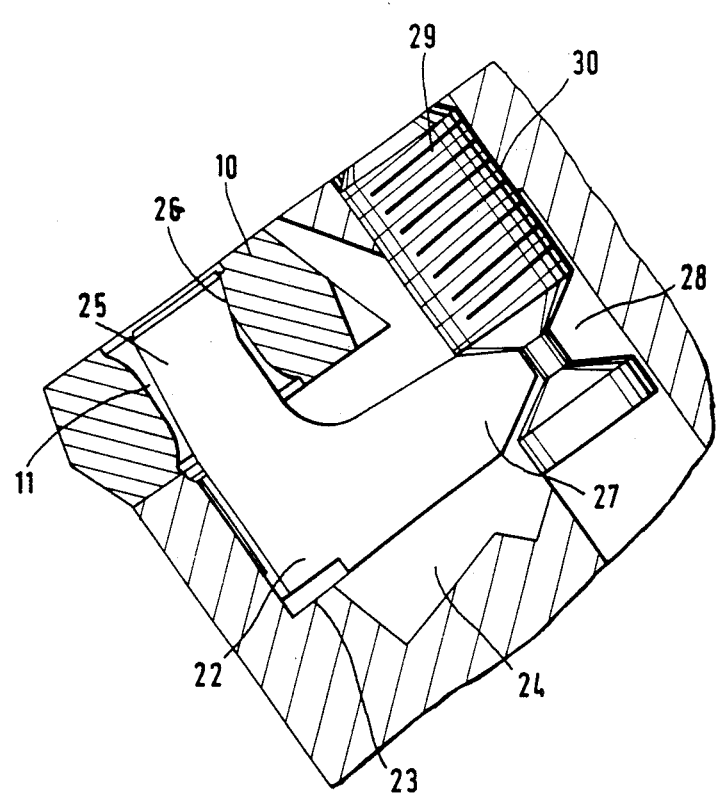
FIG. 5 is a cross sectional view taken along line V—V of FIG. 1 and to a larger scale than FIG. 1.

In the embodiments shown in FIG. 5, the clamping device includes an angle lever 22, which is pivotally supported in the vicinity of its vertex on an associated contact face 23 at the bottom of a recess 24. This recess 24 is formed in holder 1 adjacent side face 5 of recess 3. Angle lever 22 has a pin-like arm 25 which acts as a clamping element and extends into fastening bore 11 of reversible cutting plate 10. Because of the edge configuration of reversible cutting plate 10, arm 25 has a conical surface portion 26 which bears on the outer end of bore 11 that is remote from surface 5. The wall of opening 11 flares outwardly at each broadside 12. The other arm 27 of angle lever 22 engages in a groove 28 of a clamping screw 29 which is screwed into a mating threaded bore 30 of holder 1.

As can be seen, for example, in FIG. 1, angle lever 22 is oriented with respect to recess 3 so that its plane of symmetry lies in a plane passing through recess 3, with this plane intersecting the bottom face 4 of recess 3 at an acute angle and forming a right angle with side face 5. This corresponds to the plane of FIG. 5. If clamping screw 29 is tightened, angle lever 22 is pivoted clockwise about its contact face at 23, with respect to FIG. 5, with the result that reversible cutting plate 10, due to the above-mentioned orientation of angle lever 22, is urged axially to the right, with reference to FIG. 1, against abutment 7 as well as at a right angle to this direction against bottom face 4 of recess 3. Conical surface portion 26 causes reversible cutting plate 10 to further be urged with its entire inner broadside 12 against side face 5 of recess 3.

In the embodiment of an internal turning tool shown in FIGS. 9 to 12, the same relationships apply with respect to the configuration of reversible cutting plate 10 and its support in recess 3 as were described above with reference to FIGS. 1 to 5. The same parts bear the same reference numerals, except that the holder and shaft are designated 1' and 2', respectively, so that they need not be described again.

In this embodiment, a longitudinal bore 32 is provided in shaft 2 for the supply of a lubricant. At the end of the shaft, a lubricant supply channel 33 extending through holder 1' branches off from bore 32 and opens at 34 on the upper side of holder 1' in the vicinity of the major cutting edge 18 (or 19) of reversible cutting plate 10. Lubricants or coolants, or possibly also compressed air, can be introduced into the cutting region through lubricant supply channel 33 to ensure proper chip removal particularly at these locations. Moreover, the upper side of holder 1' is provided with a curved chip guide face 35 which at the frontal face follows the upper narrow edge 13 of reversible cutting plate 10.

The invention now being fully described, it will be apparent to one of ordinary skill in the art that many changes and modifications can be made thereto without departing from the spirit or scope of the invention as set forth herein.

The present disclosure relates to the subject matter disclosed in German application P 36 39 672.9 of Nov. 20th, 1986, the entire specification of which is incorporated herein by reference.

What is claimed is:

1. In a lathe tool comprising a holder and a reversible cutting plate for cutting a groove or thread, the holder being formed to have a holder recess for accommodating the cutting plate, the holder recess having a bottom face and a side face, and the cutting plate having a longitudinal dimension, two longitudinally spaced frontal end faces each having a cutting edge, a narrow longitudinally extending face extending between the frontal end faces and arranged to bear against the bottom face of the holder recess, a longitudinally extending broad side extending between the frontal end faces and transversely to the narrow face and arranged to bear against the side face of the holder recess, and a fastening bore having an axis extending transversely to the broad side, the lathe tool further including clamping means for holding the cutting plate in the recess with the narrow face and broad side of the cutting plate bearing against the bottom face and side face, respectively, of the holder recess, the clamping means including a clamping element disposed in the region of the side face of the holder recess and passing through the fastening bore in the cutting plate, and the cutting plate being reversible in position relative to the holder about the axis of the fastening bore, the improvement wherein:

said cutting plate has substantially the form of a parallelogram in the plane of said broad side, with said frontal end faces forming two opposed sides of said parallelogram;

each said frontal end face of said cutting plate is provided with a planar abutment surface portion, a transition face and a cutting edge portion, said cutting edge portion carrying said cutting edge and being disposed adjacent said transition face, at least part of said of transition face being noncoplanar with at least part of said abutment surface portion, said abutment surface portion extending over only a part of said frontal end face and being set back in the direction of the longitudinal dimension from said cutting edge portion to define, with said transition face, a cutting plate recess which is open along its edges;

said abutment surface portions of said two frontal faces are in symmetry to one another with respect to said bore axis; and said holder comprises an axial abutment member which is accommodated in said cutting plate recess and against which said abutment surface portion of said one frontal end face is pressed when said clamping means holds said cutting plate in said holder recess.

2. A lathe tool as in claim 1, wherein said cutting edge portions of said two frontal faces are symmetrically located with respect to said bore axis, one of said cutting edge portions being freely disposed in a space of said holder recess beneath said abutment member.

3. A lathe tool as defined in claim 1 wherein said holder is provided with a lubricant flow channel having an outlet end in the vicinity of that cutting edge of said cutting plate which is positioned to perform a cutting operation.

4. A lathe tool as defined in claim 1 wherein said bottom face of said holder recess forms a selected acute angle with said side face of said holder recess and said narrow face of said cutting plate has an inclined surface portion which forms the selected acute angle with said broad side of said cutting plate.

5. A lathe tool as defined in claim 4 wherein said cutting plate has two opposed narrow longitudinally extending faces, and each said narrow face has a roof shape.

6. A lathe tool as defined in claim 1 wherein: said holder has a threaded bore, and a second recess extending inwardly from said side face of said first recited holder recess, said second recess having a bottom portion; and said clamping means comprise an angle lever having a first arm in the form of a pin constituting said clamping element, a second arm, and a pivot portion from which said first and second arms extend and which is pivotally supported on said bottom portion of said second recess, and a clamping screw screwed into said threaded bore for engaging said second arm of said angle lever.

7. A lathe tool as defined in claim 1 wherein said holder has an upper side to which said holder recess extends, and said axial abutment member is located in the region of said upper side and projects beyond said side face of said recess.

8. A reversible cutting plate for installation in a holder of a lathe tool, which holder is provided with support surfaces for said cutting plate, said cutting plate having: a length dimension, a height dimension perpendicular to the length dimension and a thickness dimension perpendicular to both the height dimension and the length dimension; the substantial form of a parallelogram in the plane containing the length and height dimensions; two parallel broad sides spaced apart in the direction of the thickness dimension and extending in the directions of the length dimension and the height dimension; a fastening bore extending through said plate between said broad sides and having an axis perpendicular to said broad sides; two frontal end faces spaced apart in the direction of the length dimension, extending generally in the direction of the height dimension and defining one pair of opposed sides of the parallelogram, each said frontal end face having an abutment surface portion extending only over a part of the length dimension, a transition face portion and a cutting edge portion disposed adjacent said transition face portion and formed to have a cutting edge at least a part of said transition face portion being noncoplanar with at least a part of said abutment surface portion, said abutment surface portion being set back from said cutting edge in the direction of the length dimension to define, with said transition face, a recess which is open along its sides; and two narrow faces spaced apart in the direction of the height dimension, extending in the direction of the length dimension and defining the other pair of opposed sides of the parallelogram; wherein: said narrow faces are formed as parallel, precisely dimensioned support faces; said plate is arranged to be mounted in the holder with one broad side and one narrow face of said plate bearing against support surfaces of said holder; and said abutment surface portions of said two frontal end faces are in symmetry to one another with respect to said bore axis.

9. A plate as defined in claim 8 wherein each said narrow face has a surface portion which is adjacent to, and forms an obtuse angle with, a respective broad side.

10. A plate as defined in claim 8 wherein said broad sides are configured as precisely dimensioned abutment surfaces.

11. In a lathe tool comprising a holder and a reversible cutting plate for cutting a groove or thread, the holder having a holder recess for accommodating the cutting plate, the holder recess having a bottom face and a side face, and the cutting plate having a longitudinal dimension, two longitudinally spaced frontal end faces each having a cutting edge, a first narrow longitudinally extending face extending between the two frontal end faces and arranged to bear against the bottom face of the holder recess, a longitudinally extending broad side extending between the frontal end faces and transversely to the first narrow face and arranged to bear against the side face of the holder recess, and a fastening bore having an axis extending transversely to the broad side, the lathe tool further including clamping means for holding the cutting plate in the recess with the first narrow face and broad side of the cutting plate bearing against the bottom face and side face, respectively, of the holder recess, the clamping means including a clamping element disposed in the region of the side face of the holder recess and passing through the fastening bore in the cutting plate; and the cutting plate being reversible in position relative to the holder about the axis of the fastening bore, the improvement wherein:

said cutting plate has an entirely exposed free second narrow longitudinally extending face opposite said first narrow face, extending from one of the two frontal end faces to the other, said cutting plate having the form of a parallelogram in the plane of said broad side, with said frontal end faces forming two opposed sides of said parallelogram;

each said frontal end face of said cutting plate is provided with a planar abutment surface portion, a transition face and a cutting edge portion, said cutting edge portion carrying said cutting edge and being disposed adjacent said transition face, said abutment surface portion extending over only a part of said frontal end face and being set back in the direction of the longitudinal dimension from said cutting edge portion to define, with said transition face, a cutting plate recess which is open along its edges;

said abutment surface portions of said two frontal faces are in symmetry to one another with respect to said bore axis;

said holder comprises an axial abutment member projecting from the side face of said holder recess, said abutment member being accommodated in said cutting plate recess, said abutment surface portion of said one frontal end face being pressed against said abutment member when said clamping means holds said cutting plate in said holder recess; and said clamping means is located entirely beneath the free second narrow face of said cutting plate.

12. A lathe tool as in claim 11, wherein said cutting edge portions of said two frontal faces are symmetrically located with respect to said bore axis, one of said cutting edge portions being freely disposed in a space of said holder recess beneath said abutment member.

13. A lathe tool as in claim 12, wherein said side face has a free upper edge, said abutment member being disposed only below said upper edge, said second narrow edge of said cutting plate being disposed adjacent said upper edge.

14. A lathe tool as in claim 11, wherein said side face has a free upper edge, said abutment member being disposed only below said upper edge, said second narrow edge of said cutting plate being disposed adjacent said upper edge.

* * * * *